United States Patent
Kanterakis (10) Patent No.: US 7,099,346 B1
(45) Date of Patent: Aug. 29, 2006

(54) CHANNEL CAPACITY OPTIMIZATION FOR PACKET SERVICES

(75) Inventor: Emmanuel Kanterakis, North Brunswick, NJ (US)

(73) Assignee: Golden Bridge Technology, Inc., Long Branch, NJ (US)

( * ) Notice: Subject to any disclaimer, the term of this patent is extended or adjusted under 35 U.S.C. 154(b) by 970 days.

(21) Appl. No.: 10/144,749

(22) Filed: May 15, 2002

Related U.S. Application Data (60) Provisional application No. 60/290,642, filed on May 15, 2001.

(51) Int. Cl.
*H04L 12/28* (2006.01)
*H04B 1/69* (2006.01)

(52) U.S. Cl. .................. 370/431; 370/329; 370/341; 370/342; 370/349; 370/441; 370/479

(58) Field of Classification Search ............... 370/329, 370/341, 431
See application file for complete search history.

(56) References Cited

U.S. PATENT DOCUMENTS

| | | | |
|---|---|---|---|
| 5,604,730 A | 2/1997 | Tiedemann, Jr. | |
| 5,790,534 A * | 8/1998 | Kokko et al. | 370/335 |
| 6,317,587 B1 | 11/2001 | Tiedemann, Jr. et al. | |
| 6,347,091 B1 * | 2/2002 | Wallentin et al. | 370/437 |
| 6,463,044 B1 * | 10/2002 | Seo | 370/329 |
| 6,594,241 B1 * | 7/2003 | Malmlof | 370/329 |
| 6,697,346 B1 * | 2/2004 | Halton et al. | 370/335 |
| 6,760,303 B1 * | 7/2004 | Brouwer | 370/229 |
| 6,970,438 B1 * | 11/2005 | Mate et al. | 370/329 |
| 2001/0018342 A1 | 8/2001 | Vialen et al. | |
| 2001/0026543 A1 | 10/2001 | Hwang et al. | |
| 2001/0046220 A1 | 11/2001 | Koo et al. | |
| 2001/0053140 A1 | 12/2001 | Choi et al. | |

FOREIGN PATENT DOCUMENTS

| | | |
|---|---|---|
| WO | WO 01/39416 A1 | 5/2001 |
| WO | WO 01/59968 A1 | 8/2001 |

* cited by examiner

*Primary Examiner*—Hassan Kizou
*Assistant Examiner*—Jay P. Patel
(74) *Attorney, Agent, or Firm*—McDermott Will & Emery LLP (57) ABSTRACT

A radio network controller (RNC) application controls packet communications through base stations serving wireless remote stations. In the embodiments, the RNC stores each packet received for a wireless remote station in a buffer and maintains a BCN counter value representing the amount of buffered data. The RNC maintains a maximum accumulation timer ($Timer_{acc}$), and it restarts an inter-packet arrival timer ($Timer_{int}$) upon receipt of each packet for the station. The RNC initiates transmissions to the station in response to certain events, including expiration of either of the timers $Timer_{int}$ and $Timer_{acc}$, and if the BCN counter value exceeds a threshold. However, the transmissions use either a dedicated channel cell-state or a forward access channel state, depending on which event triggered each transmission. The RNC also may instruct the remote station to return to the forward access channel state following communication in the dedicated channel cell-state.

24 Claims, 8 Drawing Sheets

CHANNEL CAPACITY OPTIMIZATION FOR PACKET SERVICES

RELATED APPLICATION

This application claims the benefit of U.S. Provisional Application No. 60/290,642 entitled "CHANNEL CAPACITY OPTIMIZATION FOR PACKET SERVICES" filed on May 15, 2001, the disclosure of which is entirely incorporated herein by reference.

FIELD OF ENDEAVOR

The present subject matter relates to spread-spectrum communications, and more particularly to a code-division-multiple-access (CDMA) cellular, packet-switched communication system, which comprises a radio network controller (RNC), a plurality of base stations and a plurality of remote stations. The subject matter relates more particularly to methods to facilitate transitions between different channels and performance of the channels, in such a system.

BACKGROUND

Recent developments in wireless communications technologies have allowed expansion of service offerings from the original voice telephone service model to include a number of services supporting packet data communications. As customers become increasingly familiar with data services offered through landline networks, they are increasingly demanding comparable Quality of Service (QoS) data communications in the wireless domain, for example to maintain service while mobile subscribers roam freely or to provide remote service in locations where wireless loops are preferable to landline subscriber loops. A number of technologies support packet data communications in the wireless domain.

Under the currently proposed W-CDMA technical specification, there is only one type of dedicated transport channel, the Dedicated Channel (DCH), which can be either a downlink or an uplink transport channel. There are six types of common transport channels:

1. The Broadcast Channel (BCH)—downlink;
2. The Forward Access Channel (FACH)—downlink;
3. The Paging Channel (PCH)—downlink;
4. The Random Access Channel (RACH)—uplink;
5. The Common Packet Channel (CPCH)—uplink; and
6. The Downlink Shared Channel (DSCH)—shared downlink, associated with one or several downlink DCH.

With these transport channels, there are two states in the connected mode that can potentially be used to transfer packet data over the W-CDMA air interface: the Cell-FACH state and the Cell-DCH state.

In the Cell-FACH state, there are two sub-states: the RACH/FACH sub-state and the CPCH/FACH sub-state. A mobile station in the CPCH/FACH sub-state is prepared to send packets via the CPCH while tuned in to the FACH for downlink messages. In the Cell-FACH state, the Radio Network Controller (RNC) can allocate RACH or CPCH resources for uplink transmission. CPCH and RACH may be assigned by the RNC as default channels in the uplink without using uplink resources until they are needed for transmission of uplink data. RACH is able to transmit very small Packet Data Units (PDUs) effectively. RACH capacity is limited to 9 bytes at cell edge or to 75 bytes when the mobile station is close to the base station. Sequential RACH transmissions may be used to transport more PDUs than a single RACH may carry, however, the RACH access procedure must be executed for each RACH access and the subsequent delay is significant. The RNC sets a threshold measurement of traffic volume in the mobile station, essentially instructing the mobile station to send a measurement report to the RNC when, for example, the traffic volume in the mobile station uplink buffer exceeds the capacity of two RACH transmissions. That would be the load at which it would make sense to utilize a higher capacity channel to transmit the buffered uplink data. If the measurement report is triggered, the RNC may assign CPCH resources to empty the uplink buffer or can switch the mobile station to Cell-DCH state.

CPCH may be assigned instead of RACH, to provide higher capacity uplink transport. A single CPCH access may transport up to 576×16 bytes of data at the cell edge (64 frames at SF 16) or up to 36,864 bytes when the mobile station is near the base station (64 frames at Spreading Factor 4). When CPCH resources are assigned to a mobile station, the RNC sets a threshold measurement of traffic volume in the mobile station, essentially instructing the mobile station to send a measurement report to the RNC when traffic volume in the mobile station uplink buffer exceeds the capacity of five to ten CPCH transmissions. Consecutive RACH or CPCH accesses may be used until the uplink buffers are emptied.

In the Cell-DCH state, there are the DCH/DCH sub-state and the DCH/DCH+DSCH sub-state. That means the mobile station sends packet data via the DCH uplink and is tuned to receive data downlink via either the DCH or the DCH+DSCH. The DSCH is a code-sharing mechanism in the downlink direction and is more desirable when data traffic is bursty. The DCH is more suitable for streaming traffic and is not a resource efficient means of transmitting bursty uplink data. In the uplink, DCH is different in that dedicated resources in the uplink must be allocated by the RNC without complete knowledge about the amount of data to be transmitted in the uplink. For this reason an inactivity timer is used in DCH to determine if the uplink buffer at a mobile station is emptied. The RNC will measure the time period in the uplink during which there is no uplink data transmission. When this period exceeds the inactivity timer setting, the RNC will reconfigure the mobile station to Cell-FACH. In the downlink, the Radio Network Controller (RNC) can allocate either DCH or DCH+DSCH resources for packet data transmission. Similarly, the RNC does not have complete knowledge of future packet arrivals and uses instead inactivity timers to measure the time period in the downlink during which there is no data transmission. When this period exceeds the inactivity timer setting, the RNC will reconfigure the mobile station to Cell-FACH. These inactivity timers in CELL-DCH lead to substantial overhead and inefficiencies when the data traffic is bursty, thus reducing capacity.

For certain types of packet data applications (e.g. interactive service), ideally, one would like to use a Cell-FACH (e.g. CPCH/FACH sub-state) for uplink traffic and switch to a Cell-DCH state (e.g. DCH/DCH+DSCH sub-state) for downlink traffic. The reason is that there are certain deficiencies with both states. In Cell-FACH state, FACH downlink does not have closed loop power control and has only limited capability to handle large packets, whereas in the Cell-DCH state, as in any circuit-switched packet channel, there is a lot of wastage of limited resources. However, a problem with the proposed frequent switching is that a mobile station while residing in the Cell-DCH state cannot be de-allocated immediately after transmission of packet data due to the inactivity timer.

Also, when a group of packets arrive from afar, as in the case of a backbone network, there will often be time-gaps between these packets. When the RNC assigns channel resources immediately after the arrival of the first packet and does not release such resources until the last packet of the train arrives, the channel hold-up time will increase, thus creating inefficiencies.

SUMMARY

The inventions disclosed here deal with this type of deficiencies in the Cell-DCH state and the transition criteria or improvement between the Cell-FACH and Cell-DCH states on CDMA networks. The concepts and improvements described herein can also be generalized and applied to other channels as well as to other wireless digital packet communication networks.

The inventive concepts include a method for grouping a plurality of packets and sending these grouped packets in a shorter connecting time. This methodology introduces a quick release, for example, of the DCH resource associated with DCH or DCH+DSCH. By grouping the plurality of packets or reducing the release time of the DCH, the mobile station will more easily oscillate between the Cell-FACH and Cell-DCH states to support interactive type or the near-real time conversational applications of packet communications.

A general objective of the invention is to remove the inefficiencies associated with bursty data.

A further objective is to efficiently configure limited physical channel resources to various mobile stations. By reducing the connection time of a channel, the mobile station also reduces power consumption.

Another objective relates to provide a mechanism to release the DCH resources associated with the Cell-DCH state quickly.

A further objective is to enable mobile stations to oscillate between the Cell-FACH and Cell-DCH states.

A wireless packet communication network, such as a code-division-multiple-access (CDMA) telecommunication system employing spread-spectrum modulation, has a radio network controller (RNC) and a plurality of base stations, which serve a plurality of mobile stations. The term "mobile station" is used here to refer to any wireless remote user station, most examples of which are moveable, although some maybe used in fixed wireless applications. In a CDMA embodiment, each base station has a BS-spread-spectrum transmitter and a BS-spread-spectrum receiver. Each of the mobile stations has an MS-spread-spectrum transmitter and an MS-spread-spectrum receiver.

The RNC may be a physical network control node or a control application running on a network node that also implements other functions, for example on each of the base stations. In the preferred embodiment, the RNC monitors channel configuration, based on traffic measurement information of communications through the base stations for the mobile stations. Based on the traffic demand or a projection thereof, the RNC configures the physical channel resources within each cell.

The Radio Network Controller (RNC) waits to receive a packet for a mobile station (MS) from a core network. In accord with one inventive technique, while waiting for the first packet, the RNC sets its maximum packet accumulation timer, $Timer_{acc}$, to a predetermined time and resets the buffer content number, of the BCN buffer. The $T_{acc}$ is preferably less than the time that causes the communication or application to time-out (e.g. TCP/IP time-out).

Upon receiving the packet, the RNC keeps the packet in its buffer and resets its maximum inter-packet arrival timer, $Timer_{int}$, and updates the BCN counter value. The RNC then compares the updated BCN counter value with a predetermined BCNX, the buffer size threshold for switching to Cell-DCH state. If the BCN counter value is less than BCNX, the RNC will wait for a next packet for the same recipient MS until $Timer_{int}$ expires. If the RNC receives a next packet for the recipient MS before $Timer_{int}$ expires, upon receiving the next packet, it again keeps this next packet, along with any previously accumulated ones, in its buffer, resets $Timer_{int}$, updates the BCN counter value and compares BCN counter value with BCNX. The RNC repeats this process until any one of three conditions is met: (1) No further packet for the same recipient MS arrives before $Timer_{int}$ expires; (2) $Timer_{acc}$ expires; or (3) BCN counter value is greater than BCNX. In the case of (1) or (2), since the Cell-DCH switch criteria has not been triggered, the RNC will schedule the BS to send all accumulated packet(s) in its buffer to the recipient MS via FACH (Cell-FACH). In the case of (3), the Cell-DCH switch criteria is triggered, the RNC will send out a Physical Channel Reconfiguration message to instruct the recipient MS to switch to Cell-DCH and schedule the BS to send all accumulated packets in its buffer to the recipient MS via DCH or DSCH (Cell-DCH). Upon scheduling the delivery of any packets in the buffer from the BS to the MS, the RNC resets its BCN counter value to zero.

Upon delivery of the packets, the RCN will need to determine whether the MS should stay in its current state or switch to another state. The detailed description teaches a method for such determination, although the determination to switch states may be based on other conventional methods common in the art.

The RNC can detect if another packet has arrived for the recipient MS within $T_{inact}$ ms. $T_{inact}$ can be set to zero or any other values deemed appropriate. $T_{inact}$ can also be a variable set to coincide with the end of the scheduled transmission of the accumulated packets. If there is not another packet for recipient MS within $T_{inact}$ ms, the RNC will schedule a Physical Channel Reconfiguration message to instruct the recipient MS to release the DSCH and switch back to Cell-FACH state. Likewise, the buffer size also provides a way to measure congestion in the current channel. When the packet arrival rate exceeds the rate at which RNC can send out packets, packet accumulation will result in a large buffer. The RNC monitors the buffer content/size and when the buffer size exceeds a pre-determined threshold, the RNC will configure the BS to send the accumulated and scheduled packets via DCH.

Aspects of invention include methodologies for implementing such allocation of channel resources for packet transmissions based on traffic conditions, using the techniques outlined above. Other aspects of invention relate to networks and/or network controllers or other components for implementing those techniques.

Additional objects, advantages and novel features of the embodiments will be set forth in part in the description which follows, and in part will become apparent to those skilled in the art upon examination of the following and the accompanying drawings or may be learned by production or operation of the embodiments. The objects and advantages of the inventive concepts may be realized and attained by means of the methodologies, instrumentalities and combinations particularly pointed out in the appended claims.

BRIEF DESCRIPTION OF THE DRAWINGS

The drawing figures depict preferred embodiments by way of example, not by way of limitations. In the figures, like reference numerals refer to the same or similar elements.

DETAILED DESCRIPTION OF THE EMBODIMENTS

The subject matter disclosed involves a packet mode DCH/DCH+DSCH methodology for releasing the DCH resources associated with Cell-DCH state in a spread spectrum wireless communication network. The inventive access methodology accommodates bursty traffic in an optimum manner. Reference now is made in detail to the presently preferred embodiments, examples of which are illustrated in the accompanying drawings, wherein like reference numerals indicate like elements throughout the several views.

Figure 1:
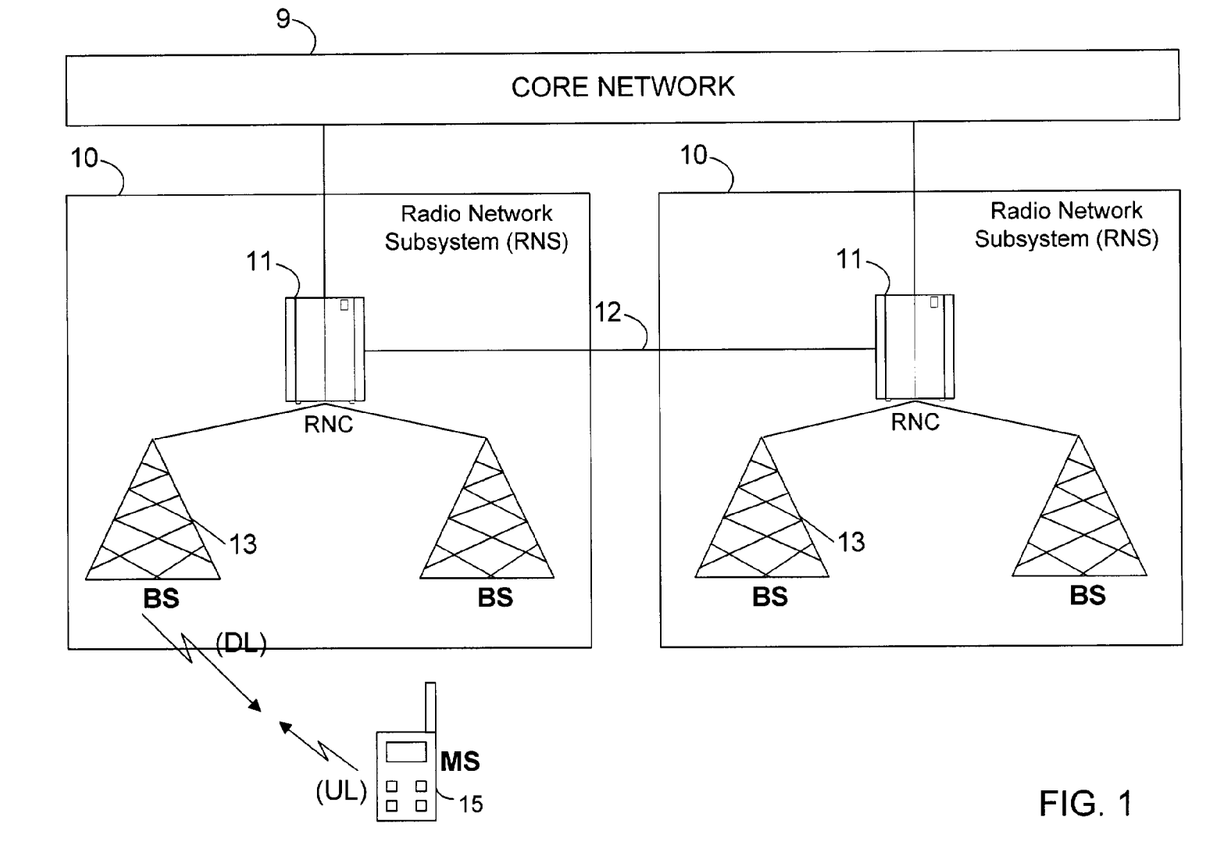
FIG. 1 is a functional block diagram of a simplified CDMA Terrestrial Radio Access network architecture, capable of implementing the communications in accord with the present invention.

In a preferred embodiment (FIGS. 1 and 2), the CDMA system comprises a radio network controller (RNC) 11, a plurality of base stations 13 and a plurality of mobile stations 15. FIG. 1 shows a simplified CDMA Terrestrial Radio Access network architecture As such, FIG. 1 provides a relatively higher level illustration, with a core network 9 providing two-way packet data communications to and from a plurality of radio network subsystems (RNSs) 10. The RNCs 11 in the radio network subsystems 10 may be interconnected, for example by the line 12.

Figure 2:
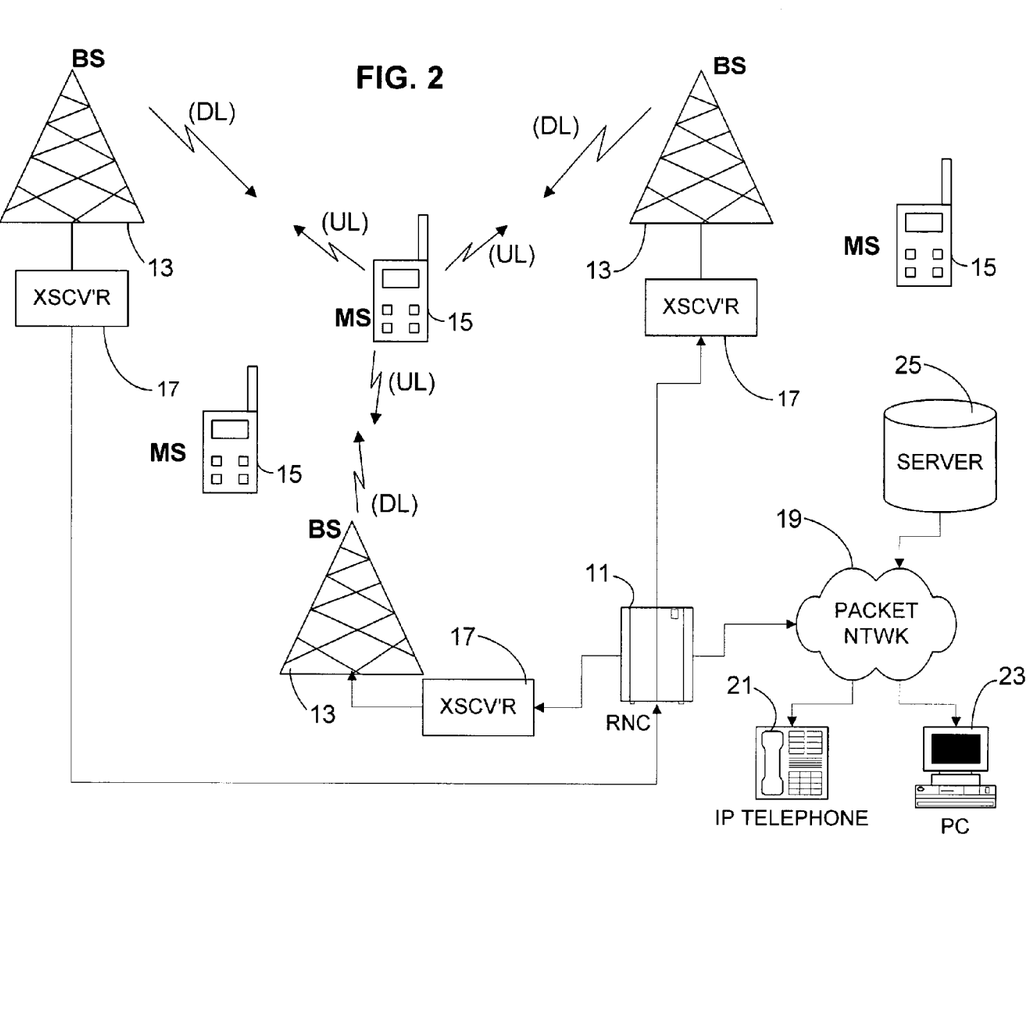
FIG. 2 is a functional block diagram of a CDMA network, capable of implementing the communications in accord with the present invention.

With reference to the more detailed version shown in FIG. 2, each base station (BS) 13 has BS-spread-spectrum transmitter and a BS-spread-spectrum receiver, shown as a single transceiver (XSCV'R) system 17 for simplicity in this drawing. Each of the mobile stations (MS) 15 has an MS-spread-spectrum transmitter and an MS-spread-spectrum receiver (not separately shown). Exemplary transmitters and receivers for use in the BS and MS network elements are discussed in more detail below with regard to FIGS. 3 and 4. In a typical embodiment, the radio network controller (RNC) 11 provides two-way packet data communications to a wide area network, shown by way of example as a packet-switched network 19. The RNC 11 and the network 19 provide the MS units 15 with two-way packet data communications services to enable communication to and from devices, represented by way of example by the IP telephone 21, the personal computer (PC) 23 and the server 25.

The CDMA system provides a number of logically different channels for upstream and downstream communications over the air-link interface. Each channel is defined by one or more of the codes, for example the spreading code and/or the scrambling code. Several of the channels are common channels, but most of the channels are used for uplink or downlink packet communications between the base stations 13 and the mobile stations 15.

The RNC 11 measures traffic through the base stations 13 going to and from the mobile stations 15. In this way, the radio network controller (RNC) 11 monitors traffic demand in the illustrated network. The RNC 11 assigns physical channel resources to the mobile stations 15, by re-configuring the state of packet data connected mode of each mobile station 15 within each cell of each base station 13. Each mobile station 15 in packet data connected mode is either in Cell-FACH state or in Cell-DCH state.

As noted earlier, the Cell-DCH state includes two sub-states the DCH/DCH sub-state and the DCH/DCH+DSCH sub-state. In each sub-state, the mobile station (MS) 15 sends packet data via the Dedicated CHannel (DCH) uplink. The mobile station (MS) 15 tunes to receive downlink data, via either the DCH or the DCH+DSCH. In the downlink, the Radio Network Controller (RNC) 11 allocates either DCH or DCH+DSCH resources for packet data transmission. The Downlink Shared CHannel (DSCH) is a Physical Channel that provides a code-sharing mechanism in the downlink direction and is desirable when data traffic is bursty.

The Cell-FACH state also has two sub-states: the RACH/FACH sub-state and the CPCH/FACH sub-state. A mobile station in the CPCH/FACH sub-state is prepared to send packets via the CPCH while tuned in to the FACH for downlink messages. In the Cell-FACH state, the Radio Network Controller (RNC) 11 can allocate RACH or CPCH resources for uplink transmission.

In accord with the present access methodology, when the RNC 11 first receives packets for a mobile station (MS) from the core or from the packet network, the RNC allocates resources for their transmission. The RNC 11 buffers the first packet and resets two timers. One timer $Timer_{int}$, specifies the maximum inter-packet arrival time $T_{int}$, that is to say, the maximum time that the RNC 11 will wait between packets intended for one station 15 without transmitting. The other timer $Timer_{acc}$ specifies the maximum packet accumulation time $T_{acc}$, that is to say, the maximum time over which the RNC 11 will accumulate packets intended for one station 15 without transmitting. The RNC 11 also updates its buffer size denotes by the BCN counter value.

The BCN counter value is compared to BCNX, a predetermined threshold for switching to Cell-DCH state. If the BCN counter value exceeds BCNX, then the RNC 11 can proceed to immediate transmission of the accumulated packets to the recipient mobile station MS 15 by first switching the MS 15 to the Cell-DCH state.

The maximum packet accumulation timer $Timer_{acc}$ defines the time limit $T_{acc}$ within which the network side components, e.g. the RNC and the base station, must transmit the oldest of the accumulated data. The $T_{acc}$ is preferably less than the time that causes the communication or application to time-out (e.g. TCP/IP time-out). At the end of this time, the RNC 11 will initiate transmission of whatever packet or packets it has received from the core network 9 or the packet network 19 since the receipt of the first (oldest)

packet in the buffer (and activation of the timers). The RNC 11 initiates transmission of the buffered packets for the particular station 15, on a first-in-first-out basis. The expiration of Timer$_{acc}$ causes the system to transmit using the Cell-FACH state.

The maximum inter-packet arrival time $T_{int}$, specified by the timer Timer$_{int}$, defines a time limit to wait for new packets to arrive from the core network 9 or the packet network 19, intended for the particular mobile station 15. If no packets arrive, within this time interval, then the RNC 11 shall proceed to the immediate transmission of the buffered packet data to the recipient mobile station MS 15.

When no additional packets arrive for the same recipient MS within a $T_{int}$ interval, the RNC 11 immediately sends all accumulated packet(s) in its buffer through base station (BS) 13 to the recipient MS 15 via FACH (Cell-FACH). However, if the RNC 11 receives a new packet, for the recipient MS, before timer Timer$_{int}$ expires, the RNC 11 adds that new packet to those previously accumulated in its buffer, resets Timer$_{int}$, updates the value for the BCN counter, and waits again for the next packet. The RNC repeats this process until the limit $T_{acc}$ for Timer$_{acc}$ expires. When Timer$_{acc}$ expires, the RNC 11 schedules the base station (BS) 13 to send all accumulated packets in its buffer to the recipient MS 14 via FACH.

If at anytime the updated BCN counter value exceeds BCNX, the RNC 11 sends a Physical Channel Reconfiguration message to instruct the recipient MS to switch back to Cell-DCH and then sends all accumulated packets in its buffer, to the recipient MS 14 via DCH or DSCH (Cell-DCH).

If the RNC 11 has scheduled transmission in the Cell-DCH state, the RNC preferably detects if there is another packet arriving for recipient MS within a period of $T_{inact}$ ms, that is to say within a maximum inactivity interval. If there is no further packet for the recipient MS 15 within $T_{inact}$ time, the RNC 11 schedules a Physical Channel Reconfiguration message to instruct the recipient MS to release the DSCH and switch back to Cell-FACH.

Figure 3:
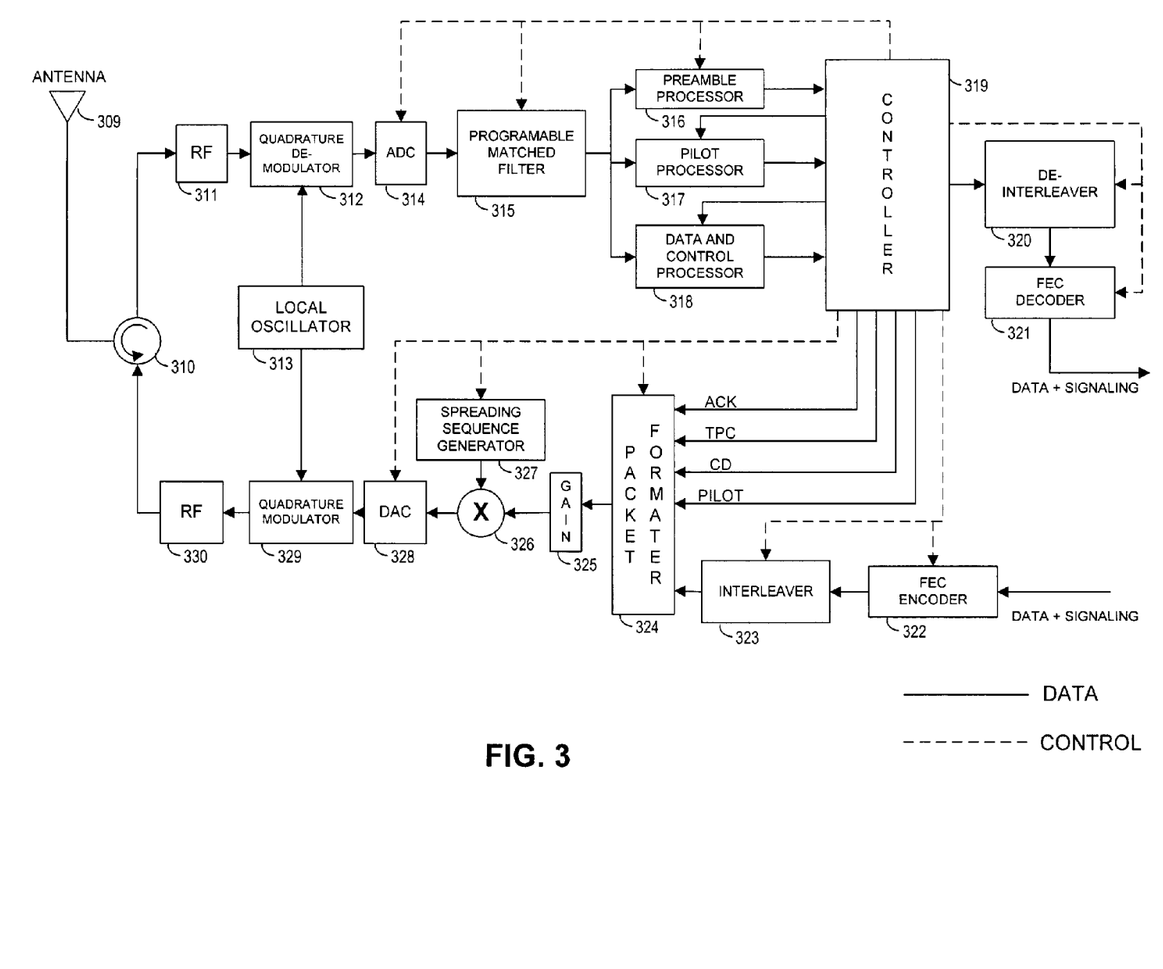
FIG. 3 is a functional block diagram of a spread spectrum base station for use in a network of the type shown in FIG. 2.

FIG. 3 illustrates a presently preferred embodiment of a BS spread-spectrum transmitter and a BS spread-spectrum receiver, essentially in the form of a base-band processor for performing the PHY layer functions. The BS spread-spectrum transmitter and the BS spread-spectrum receiver form one of the transceivers 17 at a base station 13. The BS spread-spectrum receiver includes an antenna 309 coupled to a circulator 310, a receiver radio frequency (RF) section 311, a local oscillator 313, a quadrature demodulator 312, and an analog-to-digital converter 314. The receiver RF section 311 is coupled between the circulator 310 and the quadrature demodulator 312. The quadrature demodulator is coupled to the local oscillator 313 and to the analog to digital converter 314. The output of the analog-to-digital converter 315 is coupled to a programmable-matched filter 315.

A preamble processor 316, pilot processor 317 and data-and-control processor 318 are coupled to the programmable-matched filter 315. A controller 319 is coupled to the preamble processor 316, pilot processor 317 and data-and-control processor 318. A de-interleaver 320 is coupled between the controller 319 and a forward-error-correction (FEC) decoder 321. The decoder 321 outputs data and signaling received via the UL channel to the MAC layer (not shown).

The BS spread-spectrum transmitter includes a forward-error-correction (FEC) encoder 322 coupled to an interleaver 323. A packet formatter 324 is coupled to the interleaver 323 and to the controller 319. A variable gain device 325 is coupled between the packet formatter 324 and a product device 326. A spreading-sequence generator 327 is coupled to the product device 326. A digital-to-analog converter 328 is coupled between the product device 328 and quadrature modulator 329. The quadrature modulator 329 is coupled to the local oscillator 313 and a transmitter RF section 330. The transmitter RF section 330 is coupled to the circulator 310.

The controller 319 has control links coupled to the analog-to-digital converter 314, the programmable-matched filter 315, the preamble processor 316, the digital-to-analog converter 328, the spreading sequence generator 327, the variable gain device 325, the packet formatter 324, the de-interleaver 320, the FEC decoder 321, the interleaver 323 and the FEC encoder 322.

A received spread-spectrum signal from antenna 309 passes through circulator 310 and is amplified and filtered by the receiver RF section 311. The local oscillator 313 generates a local signal, which the quadrature demodulator 312 uses to demodulate in-phase and quadrature phase components of the received spread-spectrum signal. The analog-to-digital converter 314 converts the in-phase component and the quadrature-phase component to digital signals. These functions are well known in the art, and variations to this block diagram can accomplish the same functions.

The programmable-matched filter 315 despreads the received spread-spectrum signal components. A correlator, as an alternative, may be used as an equivalent means for despeading the received spread-spectrum signal.

The preamble processor 316 detects a preamble portion of the received spread-spectrum signal. The pilot processor 317 detects and synchronizes to a pilot portion of the received spread-spectrum signal. The data and control processor 318 detects and processes the data portion of the received spread-spectrum signal. Detected data passes through the controller 319 to the de-interleaver 320 and FEC decoder 321. Data and signaling from the up-link are outputted from the FEC decoder 321 to the higher layer elements in or associated with the BS 13 and through the link to the RNC 11.

The RNC 11 supplies data and signaling over a link to the base station. In the BS transceiver, the MAC layer elements supply data and signaling information, intended for down-link transmission, to the input of the FEC encoder 322. The signaling and data are FEC encoded by the FEC encoder 322, and interleaved by the interleaver 323. The packet formatter 324 formats data, signaling, acknowledgment signal, collision detection signal, pilot signal and transmitting power control (TPC) signal into appropriate packets. Each packet is outputted from the packet formatter 324, and the packet level is amplified or attenuated by the variable gain device 325. The packet is spread-spectrum processed by the product device 326, with a spreading chip-sequence from the spreading-sequence generator 327. The packet is converted to an analog signal by the digital-to-analog converter 328, and in-phase and quadrature-phase components are generated by the quadrature modulator 329 using a signal from local oscillator 313. The modulated down-link packet is translated to a carrier frequency, filtered and amplified by the transmitter RF section 330, and then it passes through the circulator 310 and is radiated by antenna 309.

Figure 4:
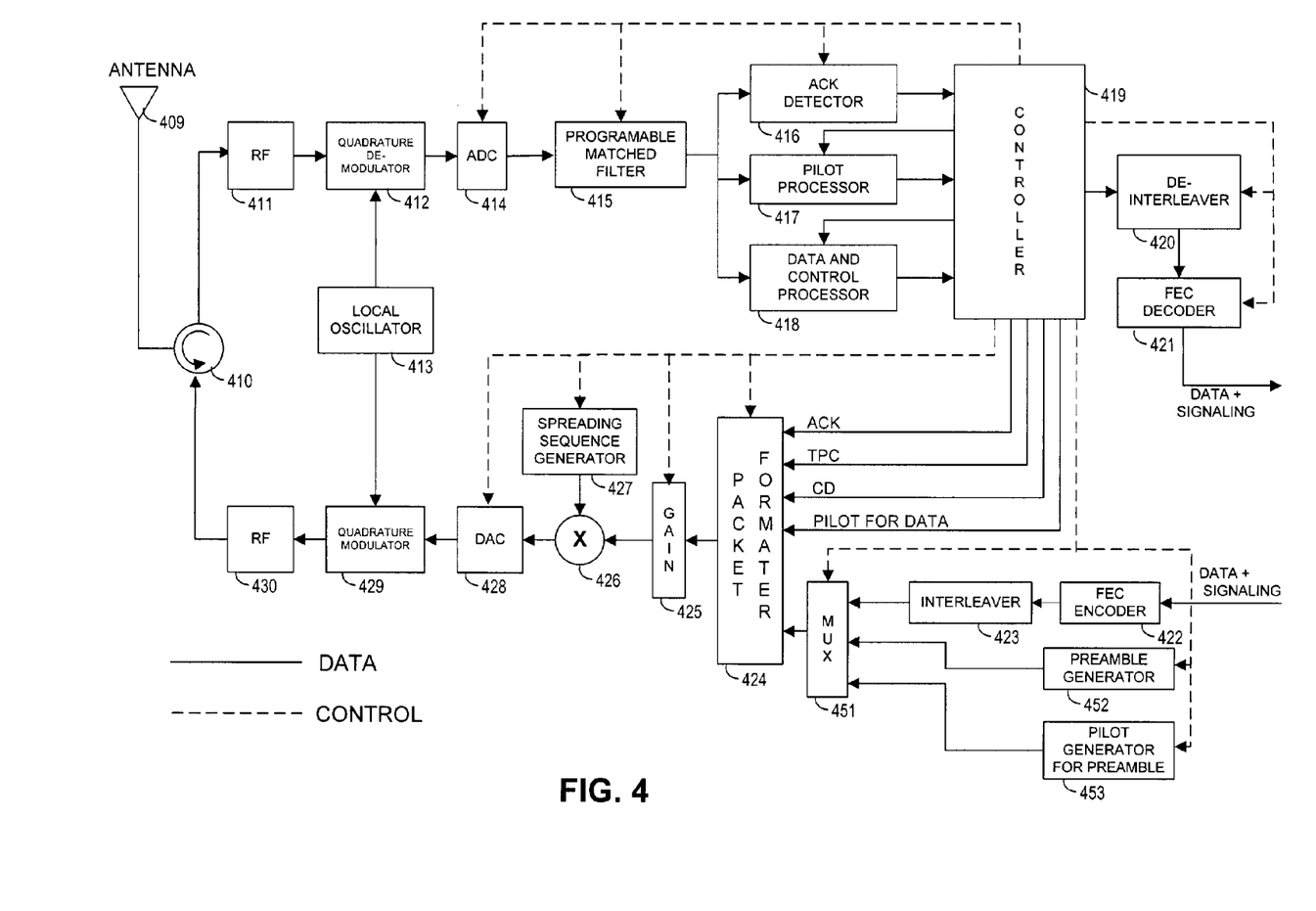
FIG. 4 is a functional block diagram of a spread spectrum remote or mobile station for use in a network of the type shown in FIG. 2.

FIG. 4 shows an embodiment of an MS spread-spectrum transmitter and an MS spread-spectrum receiver, essentially in the form of a base-band processor for performing the PHY layer transceiver functions. The MS spread-spectrum transmitter and the MS spread-spectrum receiver are located at the remote or mobile station (MS) 15. The MS spread-spectrum receiver includes an antenna 409 coupled to a circulator 410, a receiver radio frequency (RF) section 411, a local oscillator 413, a quadrature demodulator 412, and an analog-to-digital converter 414. The receiver RF section 411 is coupled between the circulator 410 and the quadrature demodulator 412. The quadrature demodulator is coupled to the local oscillator 413 and to the analog to digital converter 414. The output of the analog-to-digital converter 415 is coupled to a programmable-matched filter 415.

An acknowledgment detector 416, pilot processor 417 and data-and-control processor 418 are coupled to the programmable-matched filter 415. A controller 419 is coupled to the acknowledgment detector 416, pilot processor 417 and data-and-control processor 418. A de-interleaver 420 is coupled between the controller 419 and a forward-error-correction (FEC) decoder 421. The decoder 421 outputs data and signaling received via the DL channel to the MAC layer elements (not shown) of the MS.

The MS spread-spectrum transmitter includes a forward-error-correction (FEC) encoder 422 coupled to an interleaver 423. A packet formatter 424 is coupled through a multiplexer 451 to the interleaver 423. The packet formatter 424 also is coupled to the controller 419. A preamble generator 452 and a pilot generator 453 are coupled to the multiplexer 451. A variable gain device 425 is coupled between the packet formatter 424 and a product device 426. A spreading-sequence generator 427 is coupled to the product device 426. A digital-to-analog converter 428 is coupled between the product device 428 and quadrature modulator 429. The quadrature modulator 429 is coupled to the local oscillator 413 and a transmitter RF section 430. The transmitter RF section 430 is coupled to the circulator 410.

The controller 419 has control links coupled to the analog-to-digital converter 414, the programmable-matched filter 415, the acknowledgment detector 416, the digital-to-analog converter 428, the spreading sequence generator 427, the variable gain device 425, the packet formatter 424, the de-interleaver 420, the FEC decoder 421, the interleaver 423, the FEC encoder 422, the preamble generator 452 and the pilot generator 453.

A received spread-spectrum signal from antenna 409 passes through circulator 410 and is amplified and filtered by the receiver RF section 411. The local oscillator 413 generates a local signal, which the quadrature demodulator 412 uses to demodulate in-phase and quadrature phase components of the received spread-spectrum signal. The analog-to-digital converter 414 converts the in-phase component and the quadrature-phase component to digital signals. These functions are well known in the art, and variations to this block diagram can accomplish the same functions.

The programmable-matched filter 415 despreads the received spread-spectrum signal components. A correlator, as an alternative, may be used as an equivalent means for despeading the received spread-spectrum signal.

The acknowledgment detector 416 detects certain acknowledgments in the received spread-spectrum signal. The pilot processor 417 detects and synchronizes to a pilot portion of the received spread-spectrum signal. The data and control processor 418 detects and processes the data portion of the received spread-spectrum signal. Detected data passes through the controller 419 to the de-interleaver 420 and FEC decoder 421. Data and signaling from the DL are outputted from the FEC decoder 421 to the higher level elements in or associated with the MS 15.

In the MS transceiver, the MAC layer elements supply data and signaling information intended for transmission over the up-link channel, to the input of the FEC encoder 422. Data and signaling information are FEC encoded by FEC encoder 422, and interleaved by interleaver 423. The preamble generator 452 generates a preamble, and the pilot generator 453 generates a pilot for the preamble. The multiplexer 451 multiplexes the data, preamble and pilot, and the packet formatter 424 formats the preamble, pilot and data into a common-packet channel packet. Further, the packet formatter 424 formats data, signaling, acknowledgment signal, collision detection signal, pilot signal and TPC signal into a packet. The packet formatter 424 outputs the packet, and the packet level is amplified or attenuated by variable gain device 425. The packet is spread-spectrum processed by product device 426, with a spreading chip-sequence from spreading-sequence generator 427. The packet is converted to an analog signal by digital-to-analog converter 428, and quadrature modulator 429 using a signal from local oscillator 413 generates in-phase and quadrature-phase components. The modulated up-link packet is translated to a carrier frequency, filtered and amplified by the transmitter RF section 430 and then it passes through the circulator 430 and is radiated by the antenna 409.

U.S. Pat. No. 6,169,759 to Kanterakis et al. issued Jan. 2, 2001 provides a more detailed description of the operation of the PHY transceivers shown in FIGS. 3 and 4, for example in a CPCH type channel transmission.

Figure 5:
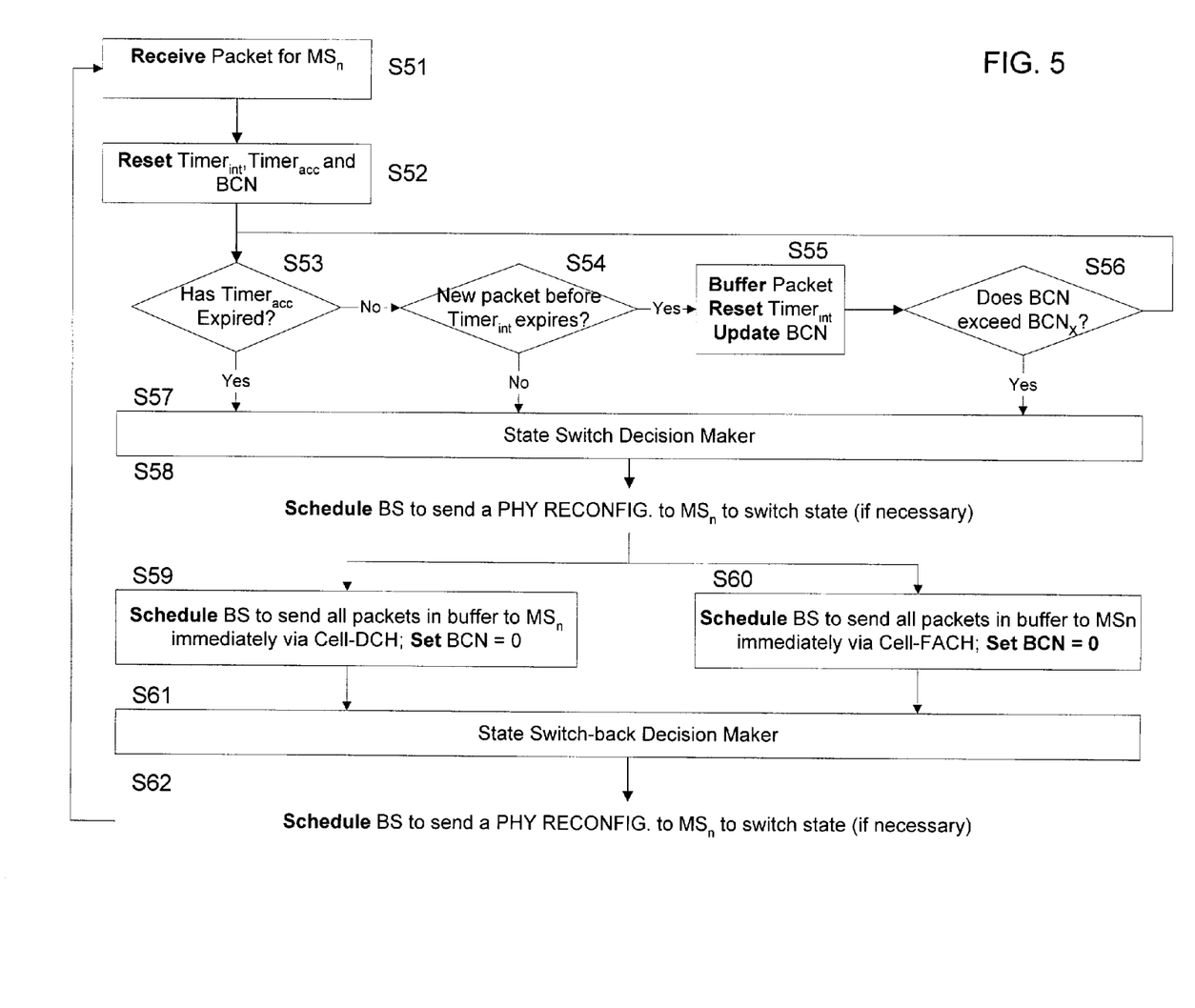
FIG. 5 is a process flow diagram illustrating an example of the RNC scheduling procedure.

FIG. 5 is a flow-chart illustrating the inventive processing, from the perspective of the RNC and/or one of the associated base stations.

Figure 8:
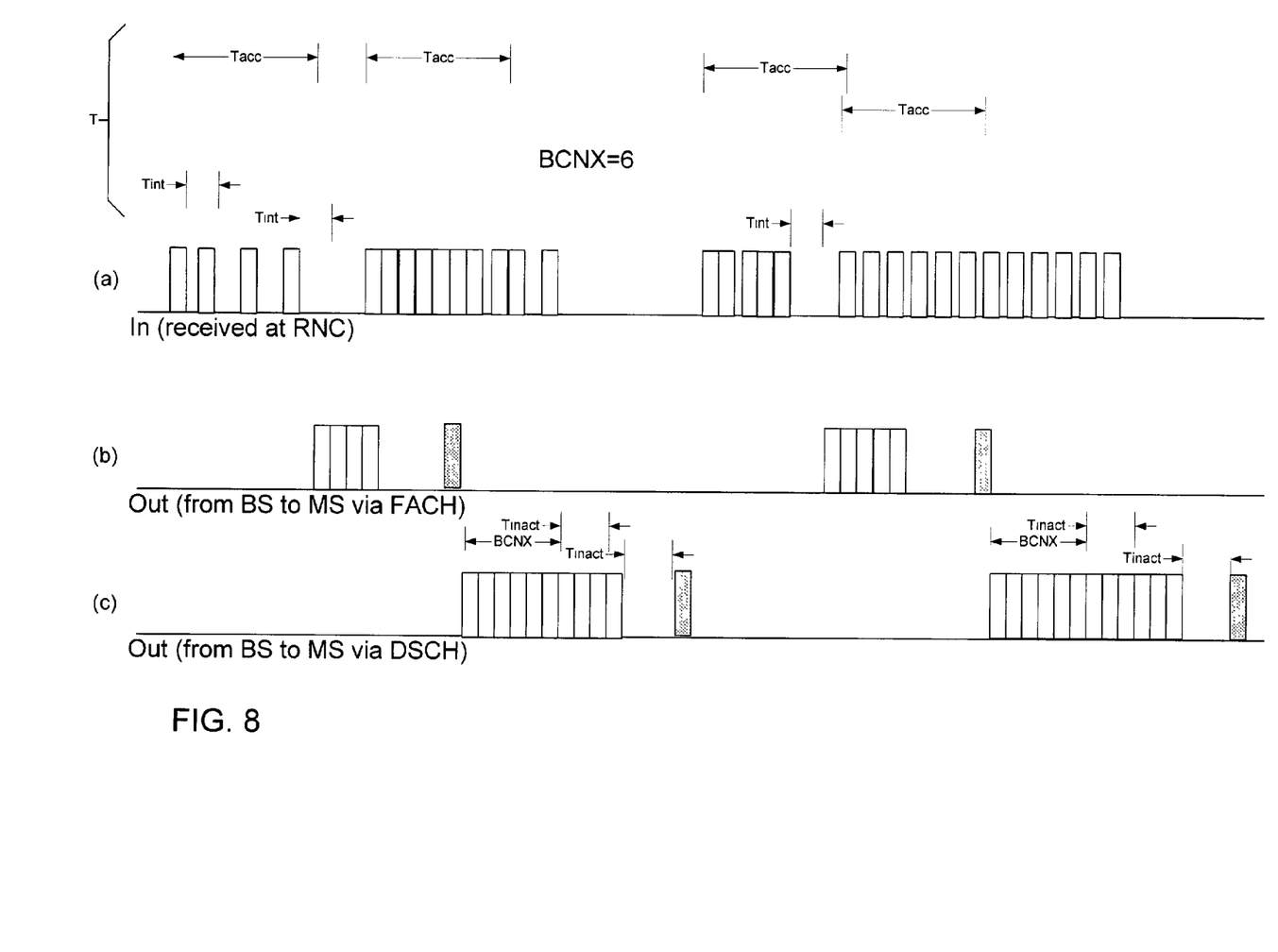
FIG. 8 is a timing diagram showing several examples of receipt and transmission of groups of packets for a particular mobile station, and the relationship thereof to certain timers used in one embodiment.

FIG. 8 is an illustration of several examples of incoming and outgoing packets of the RNC 11, in relation to the various timers and shows several examples, which are useful in explaining the inventive operations. The top line of pulses (a) represents incoming packets, for example as received at the RNC 11. The timing intervals T appear above that line. The middle line (b) represents packet transmissions from the base station (BS) 13 to a specific mobile station (MS) 15 via FACH. The bottom line (c) represents packet transmissions from the base station (BS) 13 to a specific mobile station (MS) 15 via DSCH.

Assume for example, that the RNC 11 received the first four packets, as shown to the left on line (a) of FIG. 8. Upon receipt of the first packet (S51 in FIG. 5), the RNC 11 resets and starts operation of the maximum inter-packet arrival timer, $Timer_{int}$, and the maximum packet accumulation timer, $Timer_{acc}$ (step S52). The RNC 11 also sets the value of the BCN counter for the amount of data in its packet buffer.

The timers may be implemented in any convenient manner. For example, any of the timers used herein can use a downcount approach, that is to say reset to maximum and downcount to zero. Any of the timers may alternatively implement an up-count approach, where the timer is reset to 0 and counts up to a maximum or threshold value. The timers could be analog, but preferably are implemented as digital logic, as part of the RNC application program.

In the process flow of FIG. 5, the RNC 11 checks the status of $Timer_{acc}$ in step S53. If the check of $Timer_{acc}$ indicates that the maximum packet accumulation time $T_{acc}$ has not passed since the arrival of the first packet, then the RNC 11 checks to determine if a new packet has been received before expiration of $Timer_{int}$ (step S54). If a new packet has arrived within the $T_{int}$ interval, the process branches from S54 to S55. The RNC 11 places the packet in its buffer. The maximum inter-packet arrival timer $Timer_{int}$ is reset each time one of the packets for the mobile station MS arrives before that timer expires (S55). Also, the RNC increments the BCN counter value to reflect buffering of the data of the new packet. After each reset of the inter-packet arrival timer Timer$_{int}$, the RNC checks the amount of the buffered data (S56) and if the BCN counter does not exceed the threshold BCNX, the RNC processing loops back to step S53.

In this first illustrated example (first part of FIG. 8), the RNC 11 receives only the four packets, and at some point after receipt of the fourth packet, the maximum packet accumulation timer Timer$_{acc}$ runs out. When Timer$_{acc}$ expires, the process flow branches at step S53 to the state switch decision in step S57 (FIG. 5). In the example (FIG. 8), the RNC 11 causes the base station BS 11 to send all accumulated packets in its buffer to the recipient MS$_n$ via FACH. Hence, in line (b) of FIG. 8, the BS begins sending the four packets sequentially, starting substantially at the time when Timer$_{acc}$ expired.

The RNC will use the Cell-DCH state only when the BCN counter value exceeds BCNX and when it has received packets and the MS$_n$ is still in the Cell-DCH state. In this case, assuming the MS$_n$ was in the Cell-FACH state, the first four pulses received by the RNC (FIG. 8, first part line (a) and of line (b)), will be sent by FACH (S60), and there is no need for a PHY RECONFIG message. As a result, the base station sends the four accumulated packets in a group and the mobile station 15 receives the packets as a FACH communication.

In the next example shown in FIG. 8, the RNC subsequently receives a series of ten packets intended for the mobile station (MS) 15, with somewhat random spacing therebetween (next ten packets on line (a)). In this example, the size of the buffered packet data reaches the switch threshold, BCNX, after receipt of the sixth packet but before the maximum packet accumulation timer Timer$_{acc}$ runs out. Hence, the process flow in FIG. 5 reaches the state switch decision S57 from the BCN counter value threshold decision S56. In response, the RNC 11 causes the base station BS 11 to send a Physical Channel Reconfiguration Message (S58) to the MS$_n$ 15 and then send all accumulated packets in its buffer to the recipient MS$_n$ via DSCH (S59), at this point the latest six buffered packets, as shown in line (c) of FIG. 8. Stated another way, because the buffered data exceeds the threshold before any timer expires, and the previous state was for Cell-FACH transmission, the RNC decides to switch to DSCH to provide a 'Cell-DCH' communication.

In this embodiment, the RNC 11 also implements an inactivity timer Timer$_{inact}$. If further packets are received before Timer$_{inact}$ expires, the new packets are transmitted while still in the Cell-DCH transmission. In continuing with this second example, after the first six packets in the buffer are transmitted, the inactivity timer Timer$_{inact}$ does not expire before more packets destined for this mobile station 15 arrive. Thus, the RNC will transmit the remaining four packets while in the Cell-DCH state.

A decision is made in Step S61 (in FIG. 5), and the RNC 11 instructs the base station (BS) to transmit a Physical Channel Reconfiguration message (step S62) to the mobile station (MS), as shown by the subsequent shaded pulse in FIG. 8, line (c). Receipt of the Reconfiguration message causes the intended mobile station (MS) to release the DSCH and switch back to Cell FACH state.

In the third illustrated example in FIG. 8, the RNC receives five packets for the mobile station. In this case, the timer Timer$_{int}$ expires first. Since MS$_n$ is still in the Cell-FACH state, the RNC 11 does not send a Physical Channel Reconfiguration message. Essentially, in such a case, the RNC 11 transmits the currently buffered packets via FACH while MS 15 is in the Cell-FACH state. The remaining twelve packets in FIG. 8 are transmitted using the Cell-DCH state since the BCN counter value reaches BCNX before any other timer expires.

Figure 6:
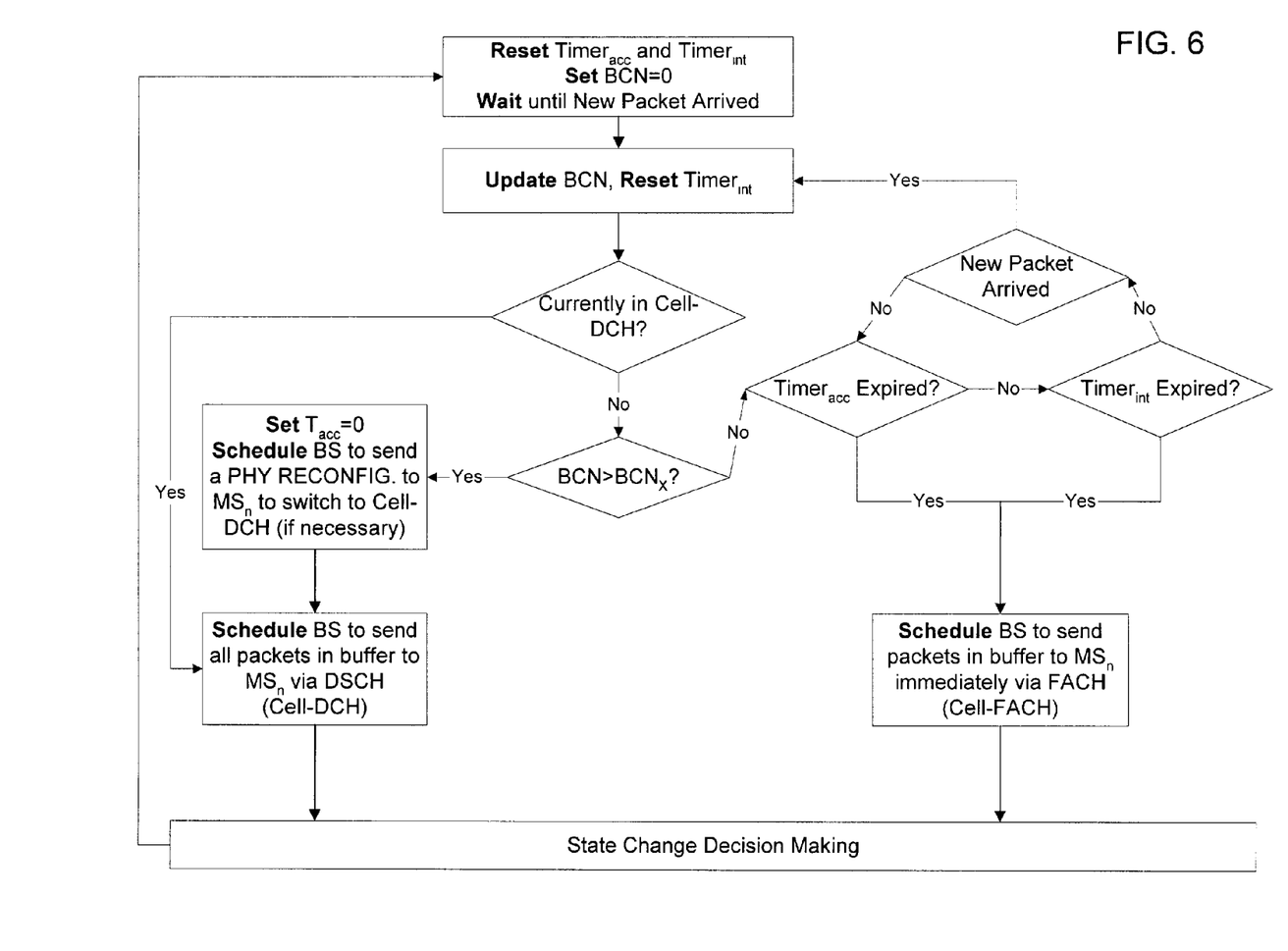
FIG. 6 is a more detailed process flow diagram of FIG. 5 illustrating an example of the RNC scheduling procedure using buffer size as the switch criteria.
Figure 7:
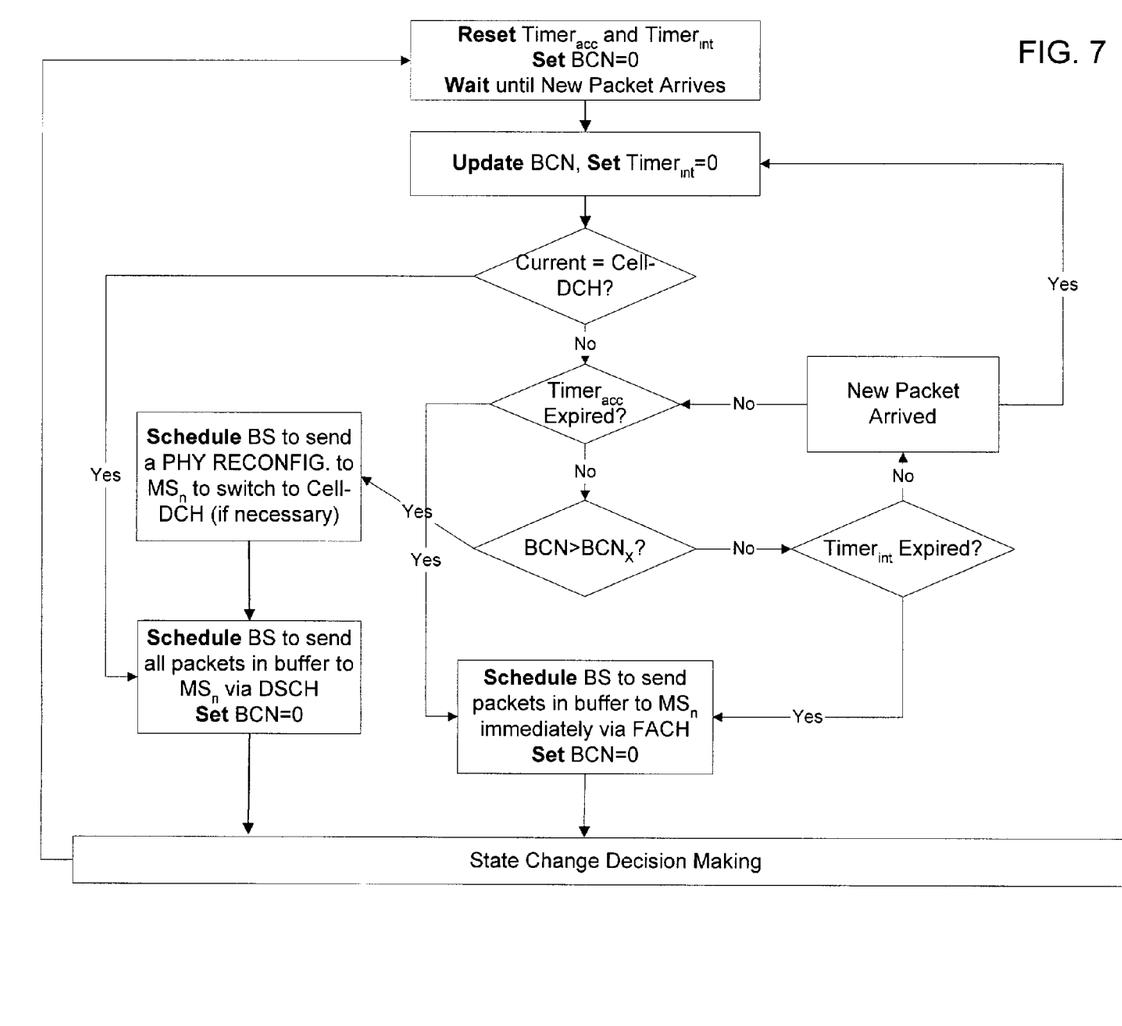
FIG. 7 is a more detailed process flow diagram of FIG. 5 illustrating an example of the RNC scheduling procedure using accumulation timer as the switch criteria.

FIGS. 6 and 7 show alternate embodiments of somewhat more detailed process flows, for the transmission timing and state decision processing by the RNC 11. The Radio Network Controller (RNC) 11 waits to receive a packet for a mobile station (MS) from a core network. While waiting for the first packet, the RNC sets its maximum packet accumulation timer, Timer$_{acc}$, to a predetermined time and its buffer content number, BCN counter value, to zero. The value of T$_{acc}$ is preferably less than the time that causes the communication or application to time-out (e.g. TCP/IP time-out).

Upon receiving a packet, the RNC 11 loads the packet into its buffer and updates the BCN counter value accordingly.

In the embodiment of FIG. 6, for example, the RNC next compares the updated BCN counter value with a predetermined BCNX value, the buffer size threshold for switching to Cell-DCH state. If the BCN counter value is less than BCNX, the RNC will wait for reception of a next packet destined for the same recipient MS, until either the timer Timer$_{int}$ or the timer Timer$_{acc}$ expires. If the RNC receives a next packet for the recipient MS before either timer expires, upon receiving the next packet, it again keeps this next packet in the buffer, along with any previously accumulated ones. At this time, the RNC again resets the timer Timer$_{int}$, updates the value of the BCN counter for the size of the data stored in the buffer and compares the BCN counter value with BCNX.

In the embodiment of FIG. 6, the RNC repeats this process until any one of three conditions is met: (1) No further packet for the same recipient MS arrives before Timer$_{int}$ expires; (2) Timer$_{acc}$ expires; or (3) BCN counter value is greater than BCNX. When any one of these events occurs, the RNC resets the value of Timer$_{acc}$.

If the buffer size value kept in the BCN counter exceeds BCNX, the Cell-DCH switch criteria is triggered, therefore the RNC will send out a Physical Channel Reconfiguration message (if necessary) to instruct the recipient MS to switch to Cell-DCH. The RNC next schedules the BS to send all accumulated packets in its buffer to the recipient MS via DCH or DSCH (Cell-DCH). In the embodiment of FIG. 6, when the packets are transmitted, the RNC checks to see if any further new packet has been received. If so, the RNC returns and schedules transmission of the additional packet(s) via the existing Cell-DCH state. This transmission loop repeats unless or until there is no further new packet to send for the time specified by the inactivity timer Timer$_{inact}$, at which point a new decision is made as to the state change and processing returns to expectation of a packet and waiting to receive a new first packet.

In the embodiment of FIG. 6, if the Cell-DCH switch criteria has not been triggered, the RNC will schedule the BS to send all accumulated packet(s) in its buffer to the recipient MS via FACH (Cell-FACH). Upon scheduling the delivery of any packets in the buffer from the BS to the MS, the RNC resets its BCN counter value to zero. However, if the current cell state is Cell-DCH transmission, the processing enters the loop for checking for a new packet and if found scheduling the BS to send all accumulated packets in its buffer to the recipient MS via DCH or DSCH (Cell-DCH).

As noted, the initial steps in the embodiment of FIG. 7 are similar to those in FIG. 6. Upon receiving a packet, the RNC loads the packet in its buffer and updates the BCN counter value. In the embodiment of FIG. 7, the RNC resets the arrival timer $Timer_{int}$. The RNC then checks to be sure that the accumulation timer $Timer_{acc}$ has not expired, and if not, the RNC compares the updated BCN counter value with the buffer size threshold BCNX for switching to Cell-DCH state. If the BCN counter value is less than BCNX, the RNC checks the arrival timer $Timer_{int}$ and whether or not it has received another packet. In this way, the RNC will wait for a next packet for the same recipient MS until $Timer_{int}$ expires.

If the RNC receives a next packet for the recipient MS before $Timer_{int}$ expires, upon receiving the next packet, it again stores this next packet, along with any previously accumulated ones, in its buffer, resets the $Timer_{int}$, updates the BCN counter value and checks the BCN counter value and the timer $Timer_{acc}$. Again, the RNC repeats this process until any one of three conditions is met: (1) No further packet for the same recipient MS arrives before $Timer_{int}$ expires; (2) $Timer_{acc}$ expires; or (3) BCN counter value is greater than BCNX.

It is contemplated that some implementations will use $Timer_{acc}$ as the criteria to switch to Cell-DCH transmission. In such an embodiment, if after buffering one or more packets, the accumulation timer $Timer_{acc}$ expires, the RNC will send out a Physical Channel Reconfiguration message (if necessary) to instruct the recipient MS to switch to Cell-DCH.

However, in the illustrated embodiment, the RNC checks the transmission state and the $Timer_{acc}$ state. If not already in the Cell DCH state and the $Timer_{acc}$ has not expired, the RNC checks the BCN counter value. If that value exceeds the threshold BCNX, the RNC next schedules the BS to send all accumulated packets in its buffer to the recipient MS via DCH or DSCH (Cell-DCH). In the embodiment of FIG. 7, if the Cell-DCH switch criteria has not been triggered, the RNC will schedule the BS to send all accumulated packet(s) in its buffer to the recipient MS via FACH (Cell-FACH). Upon scheduling the delivery of any packets in the buffer from the BS to the MS, the RNC resets its BCN counter value to zero. However, when a new packet arrives, if the current cell state is Cell-DCH transmission, the processing jumps to the step for sending all packets in its buffer to the recipient MS via DCH or DSCH (Cell-DCH).

In either embodiment (FIG. 6 or FIG. 7), in the Cell-DCH state, the RNC can detect if there is another packet arriving for recipient MS within $T_{inact}$ ms from the time the last packet was transmitted while in the Cell-DCH state. $Timer_{inact}$ is reset to $T_{inact}$ at the time the last packet was transmitted while in the Cell-DCH state. If there is not another packet for recipient MS within $T_{inact}$ ms, the RNC will schedule a Physical Channel Reconfiguration message to instruct the recipient MS to release the DSCH and switch back to Cell-FACH state. Likewise, the buffer size also provides a way to measure congestion in the current channel. When the packet arrival rate exceeds the rate at which the RNC can send out packets, packet accumulation will result in a large buffer. The RNC monitors the buffer content/size and when the buffer size exceeds a pre-determined threshold, the RNC will configure the BS to send the accumulated and scheduled packets via DCH.

In the embodiments, the state control processing was implemented in the radio network controller (RNC) 11. The RNC 11 may be implemented as a separate packet switching node in the network, which has sufficient processing capability that is programmed to detect conditions and provide instructions to the base stations, in the manner outlined above. Such an RNC node can be implemented with a general purpose programmable device having the appropriate packet interfaces for the necessary communications and sufficient processing and memory capacity necessary to perform the necessary routing and control functions. Such a device is then programmed with the executable code to implement the desired one of the processing embodiments, as part of its programming to implement its other channel allocation and routing functions in the context of the CDMA network.

The term radio network controller or RNC as used herein refers to a control functionality or application, for monitoring packet traffic and assigning radio-link resources through control of the base stations. As shown in the drawings and described above, the exemplary RNC 11 may take the form of a physically separate node between the core network and a number of base stations within one radio network system. Those skilled in the art will recognize, however, that the control functionality of the RNC may actually reside at any convenient network location or locations. For example, the RNC functionality may be combined with that of one or a distributed number of the base stations. Alternatively, the RNC functionality may be implemented in a higher-level network node, for example within another layer of controller.

While the foregoing has described what are considered to be the best mode and/or other preferred embodiments, it is understood that various modifications may be made therein and that the invention or inventions disclosed herein may be implemented in various forms and embodiments, and that they may be applied in numerous applications, only some of which have been described herein. It is intended by the following claims to claim any and all modifications and variations that fall within the true scope of the inventive concepts.

What is claimed is:

1. In a wireless packet communication network comprising a plurality of base stations for serving a wireless remote station, a method of packet transmission to the wireless remote station, comprising the steps of:
    (a) upon receiving a first packet intended for the wireless remote station, placing the packet in a buffer and starting an accumulation timer;
    (b) starting an inter-packet arrival timer;
    (c) if an amount of data stored in the buffer exceeds a threshold value, sending a message to the wireless remote station to enter a cell-state for dedicated channel communications, and causing a base station to transmit all data from the buffer to the wireless remote station over an assigned down-link channel of the wireless packet communication network in the dedicated channel cell-state;
    (d) if the amount of data stored in the buffer does not exceed the threshold value, waiting for arrival of a further packet intended for the wireless remote station;
    (e) if a further packet intended for the wireless remote station arrives before expiration of the inter-packet arrival timer, placing the further packet in the buffer, re-starting the inter-packet arrival timer and returning to step (c) to continue further performance of steps of the method; and
    (f) if the accumulation timer expires while there is data in the buffer, or if no further packet intended for the wireless remote station arrives before expiration of the inter-packet arrival timer, causing the base station to transmit data from the buffer to the wireless remote station over a channel for forward access communications.

2. The method of claim 1, wherein:
the wireless packet communication network comprises a code-division-multiple-access (CDMA) system employing spread-spectrum modulation; and
the assigned down-link channel comprises a downlink shared channel (DSCH) associated with a dedicated downlink.

3. The method of claim 1, wherein:
the wireless packet communication network comprises a code-division-multiple-access (CDMA) system employing spread-spectrum modulation; and
the transmission over a channel for forward access communications utilizes a Cell-FACH (Cell-Forward Access CHannel) communication state.

4. The method of claim 3, further comprising:
upon transmission of data from the buffer to the wireless remote station over an assigned down-link channel, starting an inactivity timer; and
if no further packet intended for the wireless remote station arrives before expiration of the inactivity timer, instructing the wireless remote station to switch from the cell-state for dedicated channel communications to the Cell-FACH state.

5. The method of claim 4, further comprising the step of:
if a further packet intended for the wireless remote station arrives before expiration of the inactivity timer, causing a base station to transmit the further packet to the wireless remote station over an assigned down-link channel of the wireless packet communication network in the dedicated channel cell-state.

6. The method of claim 1, wherein upon transmission of a last one packet from the buffer in the dedicated channel cell-state, the method further comprises:
setting a value of a BCN counter representing amount of data for the wireless remote station in the buffer to 0;
awaiting arrival of a new first packet intended for the wireless remote station; and
upon receiving the new first packet intended for the wireless remote station reinitiating at step (a) to continue further performance of steps of the method.

7. In a wireless packet communication network comprising a plurality of base stations for serving a plurality of wireless remote stations, a method comprising the steps of:
for one of the wireless remote station expected to receive a packet transmission, storing each packet received for transmission to the one wireless remote station in a packet buffer and maintaining a value representing an amount (BCN counter value) of data stored in the packet buffer, running a maximum accumulation timer ($Timer_{acc}$) from receipt of a first packet intended for the one wireless remote station, and restarting an inter-packet arrival timer ($Timer_{int}$) upon receipt of each packet intended for the one wireless remote station; and
transmitting one or more packets from the buffer through a base station to the one wireless remote station upon each occurrence of any one or more of the following events:
  (1) expiration of the inter-packet arrival timer ($Timer_{int}$),
  (2) expiration of the maximum accumulation timer ($Timer_{acc}$), and
  (3) the amount (BCNX) of data stored in the packet buffer exceeding a threshold value (BCNX);
wherein:
each step of transmitting in response to occurrence of a first one of the events comprises sending a message to the wireless remote station to enter a cell-state for dedicated channel communications, causing a base station to transmit all packets from the buffer to the one wireless remote station over an assigned down-link channel of the wireless packet communication network in the dedicated channel cell-state, and subsequently sending a message to the wireless remote station to enter a state for forward access communications; and
each step of transmitting in response to occurrence of at least one other of the events comprises causing a base station to transmit data from the buffer to the one wireless remote station over a channel for forward access communications.

8. The method as in claim 7, wherein the subsequent sending of the message to the wireless remote station to enter a state for forward access communications occurs upon expiration of an inactivity timer ($Timer_{inact}$) related to the transmission in the dedicated channel cell-state without receipt of any further packet for the one wireless remote station.

9. The method as in claim 8, wherein the inactivity timer ($Timer_{inact}$) starts running from either a beginning of a transmission in the dedicated channel cell-state or an end of a transmission in the dedicated channel cell-state.

10. The method as in claim 7, wherein:
the assigned down-link channel comprises a downlink shared channel (DSCH) associated with a dedicated downlink; and
the transmission over a channel for forward access communications utilizes a Cell-FACH (Cell Forward Access CHannel) communication state.

11. The method of claim 7, wherein the first one of the events includes the event of the expiration of the maximum accumulation timer ($Timer_{acc}$).

12. The method of claim 7, wherein the first one of the events includes the event of the amount (BCN counter value) of data stored in the packet buffer exceeding the threshold value.

13. The method of claim 12, wherein the at least one other of the events includes the expiration of the inter-packet arrival timer ($Timer_{int}$) or the expiration of the maximum accumulation timer ($Timer_{acc}$).

14. The method of claim 7, wherein the at least one other of the events comprises the expiration of at least one of the timers.

15. The method of claim 7, wherein the wireless packet communication network is a code-division-multiple-access (CDMA) system employing spread-spectrum modulation.

16. The method of claim 14, wherein the wireless packet communication network further comprises a radio network controller for monitoring the timers and the amount (BCN counter value) of data stored in the packet buffer and for detecting the occurrences of the events.

17. A radio network controller, for control of a wireless packet communication network comprising a base station for serving a wireless remote station, the radio network controller being programmed to cause the network to implement operations, comprising:
  (a) upon receiving a first packet intended for the wireless remote station, placing the packet in a buffer and starting an accumulation timer;
  (b) starting an inter-packet arrival timer;
  (c) if an amount of data stored in the buffer exceeds a threshold value, sending a message to the wireless remote station to enter a cell-state for dedicated channel communications, and causing a base station to transmit all data from the buffer to the wireless remote station over an assigned down-link channel of the wireless packet communication network in the dedicated channel cell-state;

(d) if the amount of data stored in the buffer does not exceed the threshold value, waiting for arrival of a further packet intended for the wireless remote station;

(e) if a further packet intended for the wireless remote station arrives before expiration of the inter-packet arrival timer, placing the further packet in the buffer, re-starting the inter-packet arrival timer and returning to step (c) to continue further performance of steps of the method; and (f) if the accumulation timer expires while there is data in the buffer, or if no further packet intended for the wireless remote station arrives before expiration of the inter-packet arrival timer, causing the base station to transmit data from the buffer to the wireless remote station over a channel for forward access communications.

18. The radio network controller of claim 17, comprising a program controlled node for operation in the wireless communication network; and a radio network controller application for execution on the program controlled node.

19. The radio network controller of claim 18, wherein the program controlled node is adapted for operation in a code-division-multiple-access (CDMA) system employing spread-spectrum modulation.

20. The radio network controller of claim 18, wherein the program controlled node comprises an interface for communications with the base station and an interface for communications with a core packet network.

21. A radio network controller, for control of a wireless packet communication network comprising a plurality of base stations for serving a plurality of wireless remote stations, the radio network controller being programmed to cause the network to implement operations, comprising the steps of:

for one of the wireless remote station expected to receive a packet transmission, storing each packet received for transmission to the one wireless remote station in a packet buffer and maintaining a value representing an amount (BCN counter value) of data stored in the packet buffer, running a maximum accumulation timer ($Timer_{acc}$) from receipt of a first packet intended for the one wireless remote station, and restarting an inter-packet arrival timer ($Timer_{int}$) upon receipt of each packet intended for the one wireless remote station; and transmitting one or more packets from the buffer through a base station to the one wireless remote station upon each occurrence of any one or more of the following events:

(1) expiration of the inter-packet arrival timer ($Timer_{int}$), (2) expiration of the maximum accumulation timer ($Timer_{acc}$), and (3) the amount (BCN counter value) of data stored in the packet buffer exceeding a threshold value;

wherein:

each step of transmitting in response to occurrence of a first one of the events comprises sending a message to the wireless remote station to enter a cell-state for dedicated channel communications, causing a base station to transmit all packets from the buffer to the one wireless remote station over an assigned down-link channel of the wireless packet communication network in the dedicated channel cell-state, and subsequently sending a message to the wireless remote station to enter a state for forward access communications; and each step of transmitting in response to occurrence of at least one other of the events comprises causing a base station to transmit data from the buffer to the one wireless remote station over a channel for forward access communications.

22. The radio network controller of claim 21, comprising:

a program controlled node for operation in the wireless communication network; and a radio network controller application for execution on the program controlled node.

23. The radio network control of claim 22, wherein the program controlled node is adapted for operation in a code-division-multiple-access (CDMA) system employing spread-spectrum modulation.

24. The radio network controller as in claim 21, wherein the program controlled node comprises interfaces for communications with the base stations and an interface for communications with a core packet network.

* * * * *